United States Patent [19]

Yoshii et al.

[11] Patent Number: 4,933,596

[45] Date of Patent: Jun. 12, 1990

[54] DEFLECTION YOKE WITH COMPENSATION FOR MISCONVERGENCE BY THE HORIZONTAL CENTER RASTER

[75] Inventors: Masaaki Yoshii; Norio Omura, both of Kanagawa, Japan

[73] Assignee: Sony Corporation, Tokyo, Japan

[21] Appl. No.: 279,114

[22] Filed: Dec. 2, 1988

[30] Foreign Application Priority Data

Dec. 29, 1987 [JP] Japan ................................ 62-332387

[51] Int. Cl.[5] ........................ H01J 29/70; H01F 7/00; H04N 5/645

[52] U.S. Cl. .................................... 313/440; 358/248; 335/210; 335/211

[58] Field of Search ............................ 313/440; 315/8; 358/248, 249; 335/210, 211, 214

[56] References Cited

U.S. PATENT DOCUMENTS

| | | | |
|---|---|---|---|
| 3,611,221 | 10/1971 | Ikeuchi | 313/440 |
| 3,793,554 | 2/1974 | Rossaert | 315/27 XY |
| 4,257,024 | 3/1981 | Shimoma et al. | 335/213 |
| 4,445,101 | 4/1984 | Kobayashi et al. | 335/210 |

FOREIGN PATENT DOCUMENTS

| | | | |
|---|---|---|---|
| 0145483 | 6/1985 | European Pat. Off. | |
| 62-82633 | 4/1987 | Japan | 313/440 |
| 1147218 | 4/1969 | United Kingdom | |
| 1511677 | 5/1978 | United Kingdom | |
| 1513360 | 6/1978 | United Kingdom | |
| 1591392 | 6/1981 | United Kingdom | |
| 2089116 | 6/1982 | United Kingdom | |

*Primary Examiner*—Sandra O'Shea
*Attorney, Agent, or Firm*—Alvin Sinderbrand

[57] ABSTRACT

In a deflection yoke for a color cathode-ray tube having an electron gun assembly for generating a plurality of electron beams which are directed longitudinally to converge substantially at the center of a screen, and in which a deflection magnetic field is provided through which the beams pass between the gun assembly and the screen so as to be deflected from the center of the screen for scanning the latter; horizontal center raster (HCR) misconvergence of the beams is avoided by providing a closed circuit in which an induced current is generated in response to a leakage magnetic field from the horizontal deflection magnetic field, and such induced current in the closed circuit generates a compensating magnetic field by which the distribution of the horizontal deflection magnetic field, in the longitudinal direction of the beams passing therethrough, is suitably altered.

5 Claims, 4 Drawing Sheets

DEFLECTION YOKE WITH COMPENSATION FOR MISCONVERGENCE BY THE HORIZONTAL CENTER RASTER

BACKGROUND OF THE INVENTION

1. Field of the Invention

This invention relates generally to deflection yokes and, more particularly, is directed to an improved deflection yoke for use in connection with an in-line, three-beam type color cathode-ray tube.

2. Description of the Prior Art

In a deflection yoke for a color cathode-ray tube of the in-line, three-beam type, the horizontal deflection magnetic field is made to be of the so-called pin cushion-type so as to be convergence free. However, due to the intensity distribution of such horizontal deflection magnetic field of the pin cushion-type, the outer or side beams, that is, the red and blue beams, are deflected toward the side portions of the screen or face panel by amounts that are different from the amount of deflection of the center or green beam, and the described phenomenon is usually referred to as horizontal center raster (HCR) misconvergence. More specifically, when a pin cushion-shaped horizontal deflection magnetic field is applied to the red R, green G and blue B electron beams of an in-line, three-beam color cathode-ray tube, as shown on FIG. 1A, the intensity distribution of the pin cushion-type magnetic field is as shown on FIG. 1B. Therefore, if the three beams are made coincident at the center of a picture screen SC (FIG. 2) and then deflected from the center in the horizontal direction, the amount of deflection of the side beams, that is, the red beam R and the blue beam B will be progressively greater than the amount of deflection of the center or green beam G as the extent of the horizontal deflection from the center of the screen is increased. As a result of the foregoing, the side beams R and B are displaced to positions spaced laterally outward from the center beam G, as indicated on FIG. 2, with the result that a color shift occurs in the reproduced picture.

In order to avoid the above problem, conventional deflection yokes have been constructed so that the horizontal deflection magnetic field provided thereby varies in the longitudinal direction of the yoke, that is, in the direction of travel of the electron beams therethrough so as to form a barrel-shaped magnetic field at the end or side of the yoke facing toward the electron gun or guns, and a pin cushion-shaped magnetic field at the end or side of the deflection yoke facing toward the screen or panel of the cathode-ray tube, thereby to suppress relative variations in the amounts of horizontal deflection of the red, green and blue beams for avoiding the aforementioned HCR misconvergence. However, designing the distribution of the magnetic field in the longitudinal direction so that it has a barrel-shaped configuration at one end of the deflection yoke and a pin cushion-shaped configuration at the other end does not provide a full solution to the problem in that there is no possibility to effect the further fine adjustment of such distribution after the shape of the horizontal deflection coil has been determined. In other words, due to variations in the horizontal deflection coils, as actually produced, there may be either insufficient correction or over-correction for avoiding the HCR misconvergence. This may give rise to serious difficulties, particularly, in the case of a high resolution television monitor or the like which requires final fine adjustments for obtaining sufficient accuracy in the landing positions of the electron beams.

It has also been thought to avoid or compensate for the HCR misconvergence by providing an auxiliary deflection coil supplied with a suitably adjusted horizontal deflection current from an external circuit therefor in order to generate a compensating magnetic field. However, such auxiliary deflection coil and the external circuit for supplying a suitably adjusted horizontal deflection current thereto undesirably increase the complexity and costs of the color cathode-ray tube.

OBJECTS AND SUMMARY OF THE INVENTION

Accordingly, it is an object of the present invention to provide a deflection yoke which is capable of solving the above-mentioned problems.

More specifically, it is an object of this invention to provide a deflection yoke for a color cathode-ray tube which is capable of compensating for HCR misconvergence without requiring additional external circuits for the generation of adjusted horizontal deflection currents.

A further object of the invention is to provide a deflection yoke, as aforesaid, which is capable of adjustment after assembly of the associated color cathode-ray tube so as to permit desirable accuracy in maintaining proper convergence of the electron beams at all deflected positions thereof.

In accordance with an aspect of this invention, a deflection yoke for a cathode-ray tube having gun means for generating a plurality of electron beams which are directed longitudinally to converge substantially at a center of a screen, comprises means, such as, deflection coils, located between the gun means and the screen for providing a deflection magnetic field through which the beams pass so as to be deflected from the center of the screen for scanning the latter, and means including coils defining a closed circuit in which an induced current is generated by a leakage magnetic field from the deflection magnetic field, such induced current in the closed circuit generating a compensating magnetic field by which distribution of the deflection magnetic field, in the longitudinal direction of the beams, is altered for avoiding misconvergence of the beams when deflected from the center of the screen.

The above, and other objects, features and advantages of the present invention, will become apparent from the following detailed description of a preferred embodiment of the invention which is to be read in conjunction with the accompanying drawings, throughout which corresponding elements and components are identified by the same reference numerals.

DETAILED DESCRIPTION OF A PREFERRED EMBODIMENT

Figure 3A:
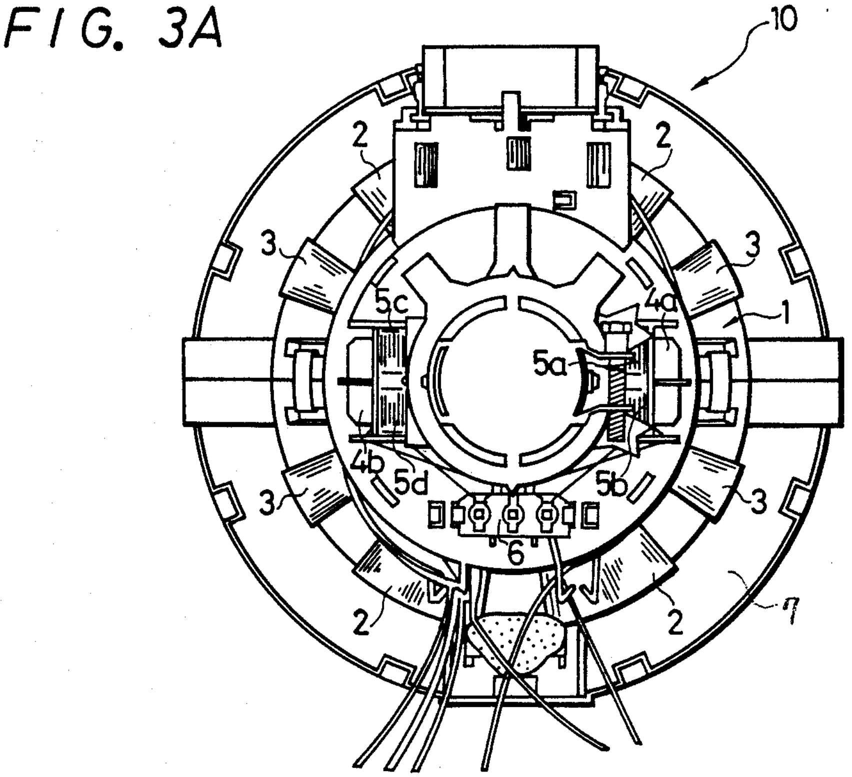
FIGS. 3A and 3B are respectively an end elevational view of a deflection yoke according to an embodiment of the present invention, as viewed from the end of the yoke which is intended to face the electron gun assembly of a color cathode-ray tube, and a side elevational view of such deflection yoke.
Figure 3B:
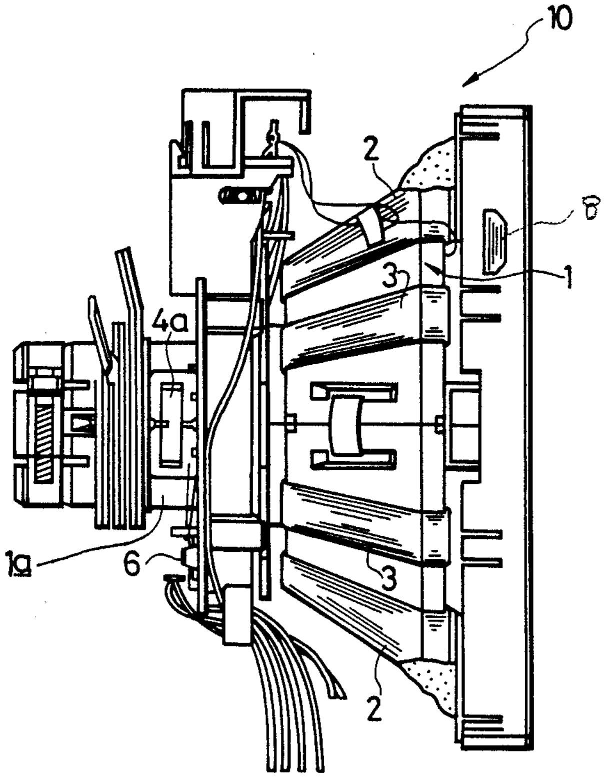

Referring to the drawings in detail, and initially to FIGS. 3A and 3B, it will be seen that a deflection yoke 10 in accordance with the present invention generally comprises a frame 7 shaped to substantially conform with the outer configuration of a cathode-ray tube (not shown) at the junction of the neck and funnel of the tube envelope, a vertical deflection coil 2 and 3 wound on a ferrite core 1 and a horizontal deflection coil 8 wound on the frame 7. At the portion 1*a* of the frame 7 that extends around the neck of the assembled cathode-ray tube, there are provided horizontally opposed C-shaped cores 4*a* and 4*b*. As particularly shown on FIG. 4, the core 4*a* includes leg portions 4'*a* directed horizontally inward from the opposite ends of a connecting portion 4''*a* toward the vertical plane y-y extending through the longitudinal axis of the cathode-ray tube. Similarly, the core 4*b* is shown to include leg portions 4'*b* extending horizontally inward from the ends of a connecting portion 4''*b* toward the plane y-y. In other words, the C-shaped cores 4*a* and 4*b* open toward each other at opposite sides of the neck portion of the cathode-ray tube (not shown) in which the electron beams R, G and B extend substantially horizontally and are laterally in line with each other.

Figure 4:
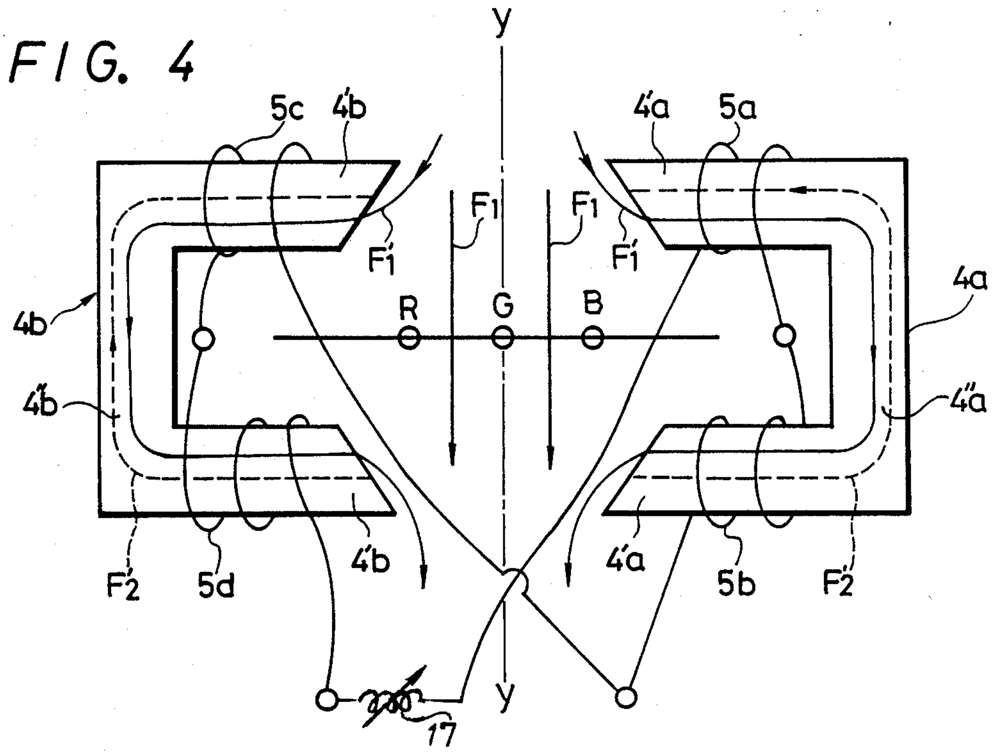
FIG. 4 is an enlarged diagrammatic view illustrating an assembly of cores with coils wound thereon for forming a closed circuit in accordance with the present invention.

Further as shown on FIG. 4, coils 5*a* and 5*b* and coils 5*c* and 5*d* are wound on the leg portions 4'*a* and the leg portions 4'*b*, respectively, of the cores 4*a* and 4*b*. The coils 5*a*–5*d* are connected, at their ends, to a terminal plate 6 (FIGS. 3A and 3B) so as to provide a closed circuit, as shown on FIG. 4. More specifically, the coils 5*a*–5*d* are all shown to be wound in the same direction on the respective leg portions 4'*a* and 4'*b* and are connected in series with each other in the order of the coils 5*a*, 5*b*, 5*c* and 5*d*, with a variable inductor 17 being connected in series between the coils and 5*a* and 5*d* for completing the closed circuit. It will be appreciated that, by being disposed at the neck portion of the frame 7 of the deflection yoke, the cores 4*a* and 4*b* and the associated coils 5*a*–5*d* are situated at an end portion or side of the deflection yoke 10 facing toward the electron gun assembly of the associated color cathode-ray tube.

As shown on FIG. 4, a leakage deflection magnetic field indicated by the solid lines $F_1$ and $F'_1$ which is emitted by the horizontal deflection coil 8 acts in the downward direction relative to the electron beams R, G and B in the neck portion of the cathode-ray tube. By reason of the provision of the cores 4*a* and 4*b*, a portion of such leakage deflection magnetic field indicated at $F'_1$ passes through the cores 4*a* and 4*b* and generates an electromotive force in the coils 5*a*–5*d* in response to changes in the horizontal deflection magnetic field. Since the coils 5*a*–5*d* with the variable inductor 17 form a closed circuit, the generated electromotive force causes an induced current to flow through the coils 5*a*–5*d* in the direction to generate, within the cores 4*a* and 4*b*, a compensating magnetic field $F'_2$ shown in broken lines on FIG. 4, and which cancels the leakage deflection magnetic field $F'_1$ applied within the cores 4*a* and 4*b*.

The compensating magnetic field indicated by the broken lines at F' has substantially the effect on the side beams R and B of converting the horizontal deflection magnetic field, in the region of the cores 4*a* and 4*b*, into a more or less pin cushion-shaped configuration. In other words, if the leakage horizontal deflection magnetic field acting in the region of the cores 4*a* and 4*b* initially had parallel lines of force, that is, was neither pin cushion-shaped nor barrel-shaped, the effect of the compensating field $F'_2$ is to more or less convert such uniform deflection magnetic field into a pin cushion-shaped deflection magnetic field acting on the beams R, G and B in the same direction. It is further to be noted that the intensity of the compensating magnetic field indicated at $F'_2$ can be adjusted by means of the variable inductor 17 in the closed circuit, and such adjustment of the intensity of the compensating magnetic field $F'_2$ determines the extent to which the deflection magnetic field acting on the beams R, G and B is deformed or distorted in the direction toward a pin cushion-shaped field.

However, as earlier noted, for correcting the HCR misconvergence, it is necessary that the distribution of the horizontal deflection magnetic field in the longitudinal direction of the deflection yoke should be arranged to provide a pin cushion-shaped configuration at the end or side facing toward the screen of the cathode-ray tube and a barrel-shaped configuration at the side or end facing toward the electron gun assembly. Thus, by itself, the compensating magnetic field $F'_2$ provided within the cores 4*a* and 4*b* in accordance with this invention, in having a pin cushion-like effect when considered alone, would act to increase the HCR misconvergence rather than correcting the same. Therefore, in accordance with the present invention, the cores 4*a* and 4*b* with the coils 5*a*–5*d* wound thereon and connected in a closed circuit are provided in association with a horizontal deflection coil 8 having a configuration, as earlier described, which is capable of effecting over-correction of the HCR misconvergence. In other words, the horizontal deflection coil 8 is arranged to have a pin cushion-shaped configuration at the end or side of the deflection yoke facing toward the screen and a barrel-shaped configuration, as indicated on FIG. 5A, at the end or side of the deflection yoke facing toward the electron gun assembly with such barrel-shaped configuration being effective to over-correct the HCR misconvergence. By combining such horizontal deflection coil 8 with the cores 4*a* and 4*b* having the coils 5*a*–5*d* thereon connected in a closed circuit, the pin cushion-like effect of the compensating field $F'_2$, which can have its intensity adjusted by the variable inductor 17, can be made to precisely remove the over-correction achieved by the barrel-shaped configuration of the main horizontal deflection magnetic field at the end of the deflection yoke facing toward the electron gun assembly, whereby to achieve precise compensation for, or removal of the HCR misconvergence.

Figure 1A:
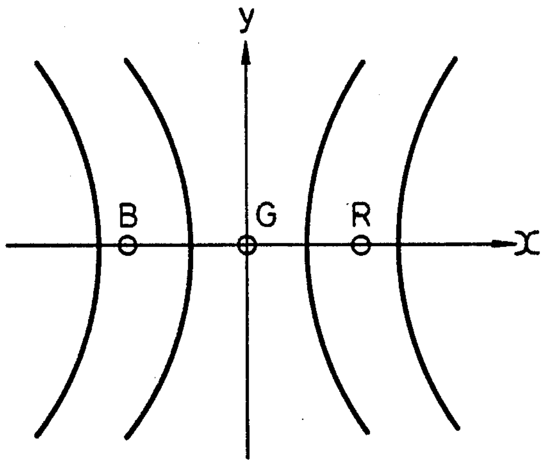
FIGS. 1A and 1B are diagrammatic views to which reference is made in explaining the configuration and distribution of intensity, respectively, of a pin cushion-shaped magnetic field.
Figure 1B:
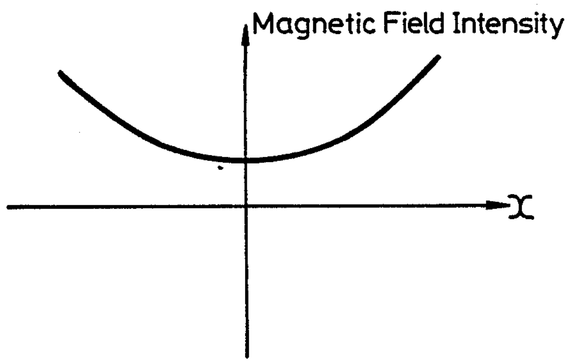
Figure 2:
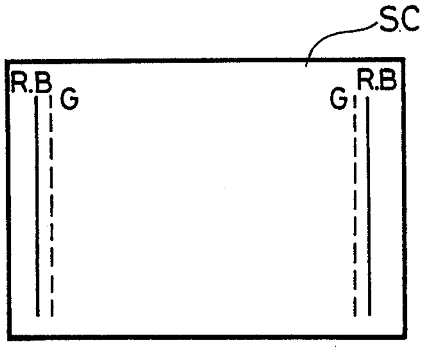
FIG. 2 is a diagrammatic elevational view of the screen of a color cathode-ray tube, and which illustrates how differential deflections of the outer or side beams and of the center beam, respectively, cause misconvergence of the beams when deflected to impinge on side portions of the screen.
Figure 5A:
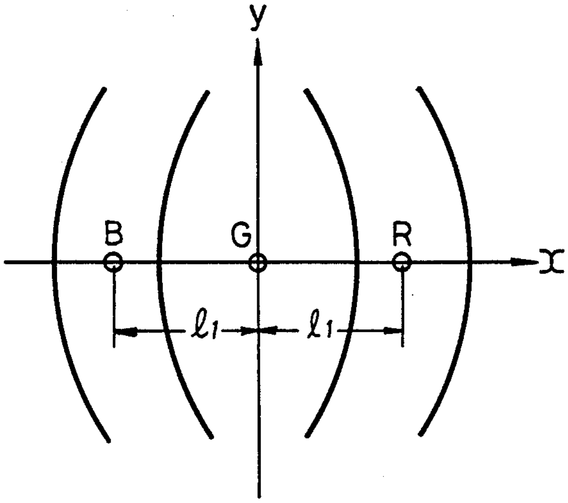
FIG. 5A and 5B are diagrammatic views similar to those of FIGS. 1A and 1B, respectively, but illustrating the configuration and intensity of a barrel-shaped magnetic field.
Figure 5B:
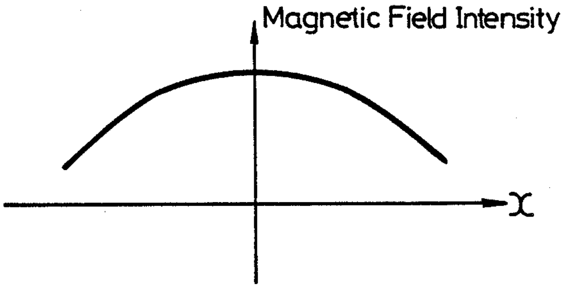

The manner in which the barrel-shaped configuration of the horizontal deflection magnetic field at the side of the deflection yoke 10 facing toward the electron gun assembly can correct the HCR misconvergence will be apparent from a consideration of the intensity distribution of the barrel-shaped magnetic field shown on FIG. 5B. From such intensity distribution, it will be apparent that, if the barrel-shaped horizontal deflection magnetic field is applied to the three beams R, G and B, as shown in FIG. 5A, the amount of deflection of the center beam G, relative to the amount of deflection of the side beams B and R is increased as the deflection increases so that, at the opposite side portions of the screen SC, the landing spot of the center beam G is displaced outwardly relative to the landing spots of the side beams R and B, as shown on FIG. 7. Such relative displacement of the landing spot of the center beam G relative to the landing spots of the side beams R and B is just the opposite of the relative displacements of the landing spots of such beams characteristic of the HCR misconvergence shown on FIG. 2.

Figure 6:
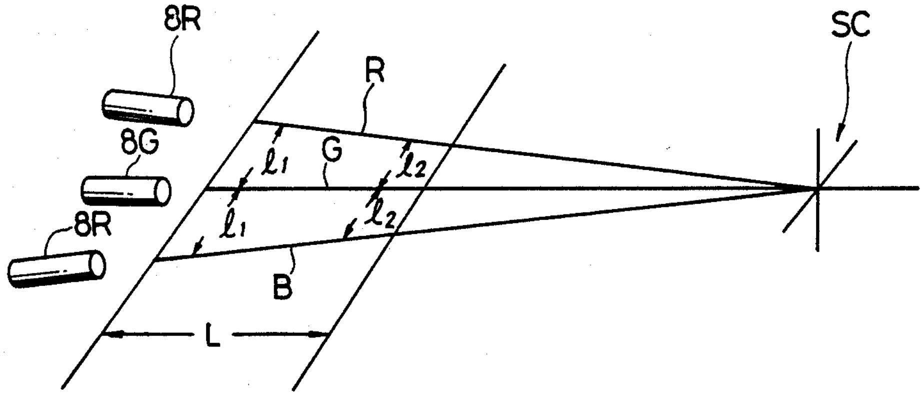
FIG. 6 is a diagrammatic view of an electron gun assembly for providing the converging electron beams in a color cathode-ray tube to which the present invention is applied.

Furthermore, as shown schematically in FIG. 6, the electron beams R, G and B emitted from the electron guns $8_R$, $8_G$ and $8_B$, respectively, typically follow converging paths to the screen or panel SC so that, at the end of the length or distance L covered by the deflection yoke 10 which faces toward the electron guns, the distance $L_1$ between each of the side beams R and B and the center beam G is larger than the distance $l_2$ between the respective side beams and the center beam at the end of the length L facing toward the screen SC. By reason of the foregoing, the HCR can have greater influence on the electron beams at the side of the deflection yoke facing toward the electron gun assembly than at the side of the deflection yoke facing toward the screen or panel. Thus, by providing the horizontal deflection magnetic field with a barrel-shaped configuration at the side facing toward the electron gun assembly it is possible to even over-correct the HCR misconvergence, as shown on FIG. 7, while the horizontal deflection magnetic field is, on average or for the most part, effective as a field of the pin cushion-type.

Figure 7:
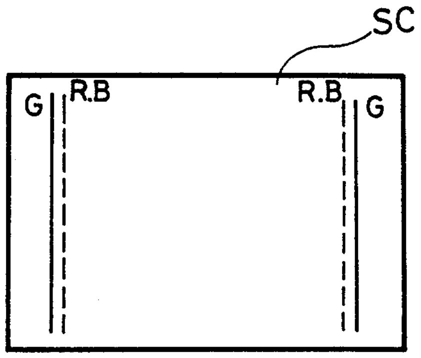
FIG. 7 is a diagrammatic view similar to that of FIG. 2, but showing the relative deflections of the red and blue beams and the green beam resulting from the over-correction of the HCR misconvergence effected by the configuration of the main magnetic deflection field, that is, without the application of a further compensating magnetic field in accordance with this invention.

In any event, it will be appreciated that the HCR misconvergence can be accurately and conveniently corrected by combining the horizontal deflection coil 8 constructed to provide the barrel-shaped configuration of the horizontal deflection magnetic field at the end facing toward the electron gun assembly, with the cores 4*a* and 4*b* and the coils 5*a*–5*d* wound thereon and connected in a closed circuit so as to selectively and adjustably remove the over-corrected condition illustrated on FIG. 7.

Since the compensating magnetic field $F'_2$ is generated in the cores 4*a* and 4*b* by the induced current made to flow in the coil 5*a*–5*d* of the closed circuit by the horizontal deflection magnetic field, it is not necessary to provide any additional external connections or circuits. Therefore, the correction of the HCR misconvergence is simply effected.

Although a preferred embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A deflection yoke for a cathode ray tube having gun means for generating a plurality of electron beams which are directed longitudinally to converge substantially at a center of a screen, comprising:

means including a horizontal deflection coil located between said gun means and said screen for providing a horizontal deflection magnetic field through which said beams pass so as to be deflected from said center of the screen for horizontally scanning the latter, said horizontal deflection coil being configured to provide said horizontal deflection magnetic field with a barrel-shape at the side of the horizontal deflection coil facing toward said gun means sufficient to over-correct a horizontal center raster misconvergence and with a pin-cushion configuration at the end of the deflection yoke facing toward said face panel; and means for defining a closed circuit in which an induced current is generated by a leakage magnetic field from said deflection magnetic field and which includes a plurality of supplemental coils, a pair of C-shaped cores having said coils wound thereon and an indicator connected with said coils for restricting the flow of said induced current therethrough, said induced current in said closed circuit generating a compensating magnetic field by which distribution of said deflection magnetic field, in the longitudinal direction of said beams, is altered for avoiding misconvergence of said beams when deflected from the center of said screen.

2. A deflection yoke as in claim 1; wherein said induction is a variable inductor.

3. A deflection yoke as in claim 1; wherein said supplemental coils and inductor are connected in series with each other.

4. A deflection yoke as in claim 1; wherein said gun means generates at least three of said electron beams in an in-line arrangement of inner and outer beams; and wherein said C-shaped cores are disposed at an end portion of the deflection yoke facing toward said gun means, said C-shaped cores being in opposed relation opening toward each other with said in-line arrangement of the beams therebetween so that said compensating magnetic field acts more strongly or the outer beams.

5. A deflection yoke for a color cathode-ray-tube having gun means for generating a center beam and two side beams arranged in-line and which converge with said center beam to achieve a substantially common landing spot at the center of a face panel, said deflection yoke comprising:

means including a horizontal deflection coil located between said gun means and said screen for providing a horizontal deflection magnetic field through which said beams pass so as to be deflected from said center of the panel for horizontally scanning the latter, said horizontal deflection coil being configured to provide said horizontal deflection magnetic field with a barrel-shape at the side of the horizontal deflection coil facing toward said gun means sufficient to over-correct a horizontal center raster misconvergence and with a pin-cushion shape at the end of the deflection yoke facing toward said face panel; and means connected in a closed circuit in which an adjustable induced current is generated by a leakage of said horizontal deflection magnetic field and which includes supplemental coils round upon a pair of C-shaped cores and a variable inductor for effecting the adjustment of said induced current, said adjustable induced current in said closed circuit generating an adjustable compensating magnetic field by which the effect of said barrel-shape of said horizontal deflection magnetic field is adjustably counteracted for removing the over-correction of the horizontal center raster misconvergence, said C-shaped cores being disposed at the side of the deflection yoke facing toward said gun means in opposed relation opening toward each other with said in-line arrangement of the beams therebetween so that said compensating magnetic field acts more strongly on the outer beams.

* * * * *